Oct. 27, 1931.  E. C. COOK  1,828,959
TURNTABLE
Filed Aug. 22, 1930  2 Sheets-Sheet 2

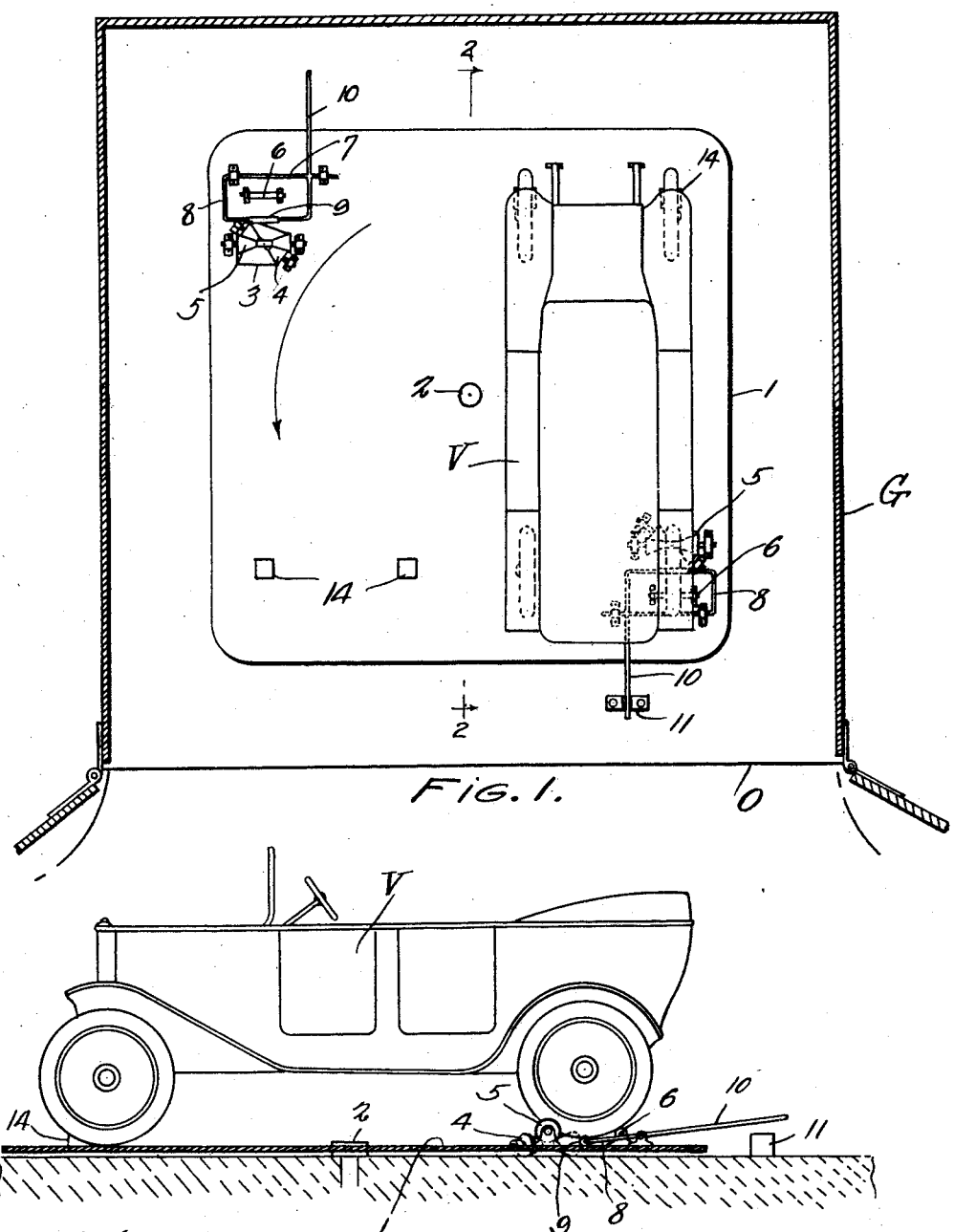

E. C. Cook  Inventor

By C. A. Snow & Co.
Attorneys.

Patented Oct. 27, 1931

1,828,959

UNITED STATES PATENT OFFICE

EGBERT C. COOK, OF PUENTE, CALIFORNIA

TURNTABLE

Application filed August 22, 1930. Serial No. 477,121.

This invention relates to a turntable designed particularly for use in garages and other structures whereby an automobile or other like motor vehicle can be driven into the structure through a door opening, turned under its own power, about a center close to the side of the vehicle, and then driven out through the same opening.

A further object is to provide a turntable which is simple in construction, can be installed readily in a garage, and is formed of few parts.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is a plan view of the turntable showing an automobile in position immediately after entering the garage which is shown in section.

Figure 2 is a section on line 2—2, Figure 1.

Figure 3:
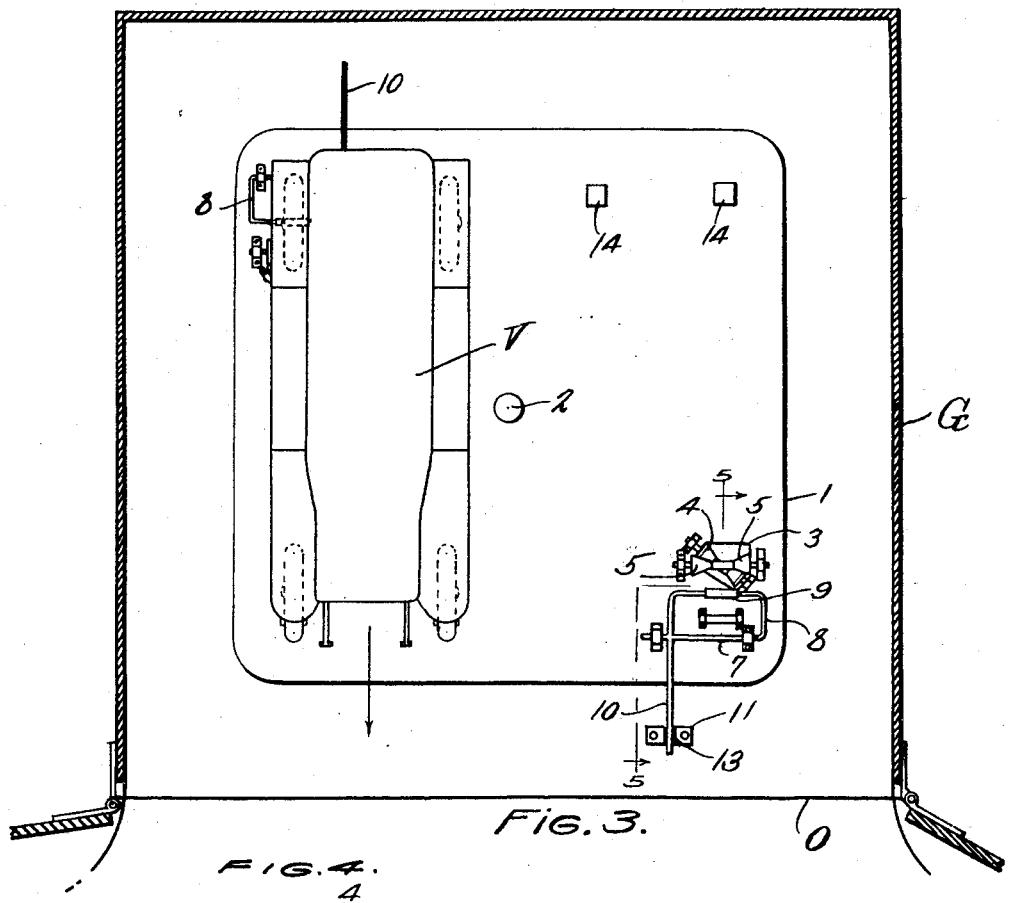
Figure 3 is a view similar to Figure 1 showing the turntable in position to allow the automobile to drive out of the garage.
Figure 4:
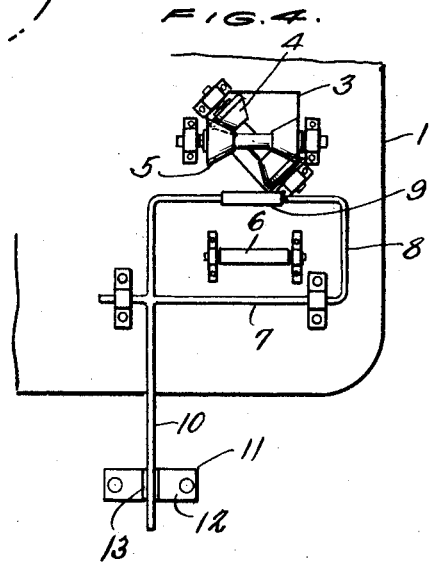
Figure 4 is an enlarged plan view of the drive mechanism of the turntable.
Figure 5:
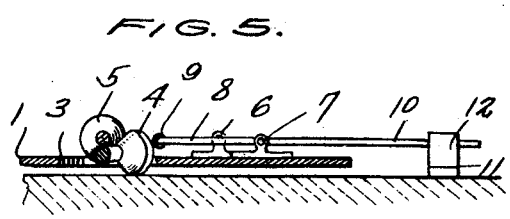
Figure 5 is an enlarged section on line 5—5, Figure 3.

Referring to the figures by characters of reference, 1 designates a platform of sufficient size to support two motor vehicles side by side. This platform has a central pivot device 2 of any desired construction and is supported close to the floor of a garage G so that a motor vehicle entering or leaving via the door opening O can move readily onto or off of the platform.

An opening 3 is formed in the platform adjacent to each of two diametrically opposed corners of the structure and journaled in each opening is a supporting roller in the form of a double cone 4 disposed radially relative to pivot 2. Located above and in frictional engagement with the double cone 4 is another double cone 5 arranged parallel with the axis of rotation of the drive wheels of the motor vehicle to be turned. In other words the double cone 5 is arranged diagonally across double cone 4 as shown.

A supporting roller 6 is mounted for free rotation between double cone 5 and the adjacent end of the platform and journaled between this roller and the end of the platform is a rock bar 7 having a bail 8 extending around roller 6 and close to double cone 5. Another roller 9 is journaled on the bail 8 and is supported close to and parallel with the axis of the double cone 5.

Extending from bar 7 is an arm 10 which projects beyond the end of the platform and overbalances the bail. A keeper 11 having opposed inclined faces 12 leading up to a notch 13, is secured to the floor of the garage and is so located that when the platform approaches either of its normal positions with one of its ends close to and substantially parallel with the door opening, one of the arms 10 will ride over one of the faces 12 and drop into notch 13, thereby holding the platform against further rotation until unlocked. Arm 10 can be resilient so as to yield slightly when it drops into the keeper, thereby preventing the platform from coming to a stop too abruptly.

It is preferred to have the locking means at the place where the motor vehicle V enters the garage. As the vehicle is driven in one of its front wheels will pass over bar 7, rollers 6 and 9, and cone 5, and both front wheels will come against low chocks or bumpers 14. This action will cause arm 10 to momentarily lift from keeper 11 but it will promptly return to position until one of the rear drive wheels of the vehicle moves onto rollers 6 and 9 and cone 5. At that time the bail will be held down and arm 10 will be lifted to release the platform. One of the rear or drive wheels will continue to rotate and as it is supported by double cone 5 and roller 6 said double cone will be rotated and will transmit motion to the double cone 4 thereunder. Consequently the platform will turn about its pivot 2 until the other arm 10 drops into the keeper 11 at which time the rotation of the vehicle wheel can be stopped and said vehicle will be supported where it can drive straight out through the door opening as indicated by the arrow in Figure 3.

Obviously by means of this apparatus a motor vehicle can be driven straight into a garage and can continue to function until its position in the garage is reversed. Thus the necessity of backing out and turning is avoided.

What is claimed is:

1. A device of the class described including a platform mounted for rotation about a central pivot, a roller carried thereby for supporting a portion of the platform, a roller above and frictionally engaging the same to drive the platform about its pivot, and a roller carried by the platform and cooperating with the upper drive roller to support a power-driven vehicle wheel.

2. A device of the class described including a platform mounted for rotation about a central pivot, a roller carried thereby for supporting a portion of the platform, a double cone roller above and frictionally engaging the same to drive the platform about its pivot, and means for supporting a power-driven wheel of a vehicle in driving contact with the double cone roller.

3. A device of the class described including a platform mounted for rotation about a central pivot, a conical roller connected to the platform for supporting a portion thereof, said roller being disposed radially of the pivotal center of the platform, a double cone roller above and frictionally engaging the same to drive the platform about its pivot, and means for supporting a power-driven wheel of a vehicle in driving contact with the double cone roller.

4. A device of the class described including a platform mounted for rotation about a central pivot, a roller carried thereby for supporting a portion of the platform, a roller above and frictionally engaging the same to drive the platform about its pivot, and a roller carried by the platform and cooperating with the upper drive roller to support a power-driven vehicle wheel, means for holding the platform against rotation, and means controlled by the weight of a vehicle wheel on the platform for releasing said means.

5. A device of the class described including a platform mounted for rotation about a central pivot, a roller carried thereby for supporting a portion of the platform, a roller above and frictionally engaging the same to drive the platform about its pivot, and a roller carried by the platform and cooperating with the upper drive roller to support a power-driven vehicle wheel, means for holding the platform against rotation, and means controlled by the weight of a vehicle wheel on the platform for releasing said means, said means including an arm on the platform, a stationary keeper in the path thereof adapted to be engaged thereby, and means movable under the weight of a wheel for shifting the arm from engagement with the keeper.

6. The combination with a platform mounted for rotation about a pivot, a stationary keeper, and separate fastening means on the platform for successively engaging the keeper, of separate means operated by a motor vehicle when driven onto the platform, for successively releasing one fastening means from the keeper and turning the platform through a one-half circle to reverse the position of the vehicle and bring the other fastening means into engagement with the keeper.

In testimony that I claim the foregoing as my own, I have hereto affixed my signature.

EGBERT C. COOK.